Fig.1

Feb. 19, 1935. J. W. LOGAN, JR 1,991,903
ELECTRIC BRAKE MECHANISM
Filed May 4, 1934  3 Sheets-Sheet 2

INVENTOR
JOHN W. LOGAN, JR.
BY

ATTORNEY

Patented Feb. 19, 1935

1,991,903

UNITED STATES PATENT OFFICE 1,991,903

ELECTRIC BRAKE MECHANISM

John W. Logan, Jr., Wilkinsburg, Pa., assignor to The Westinghouse Air Brake Company, Wilmerding, Pa., a corporation of Pennsylvania Application May 4, 1934, Serial No. 723,853

27 Claims. (Cl. 188—156)

This invention relates to a vehicle braking system, and more particularly to such a system in which the braking effect is produced by the operation of an electrodynamic brake combined with a friction brake.

In the braking of high speed trains a desirable brake to employ is one of the electrodynamic type, such as that known as the eddy current brake, because with an electrodynamic brake high braking effort can be obtained at high train speeds without severe shock being caused by an excessive rate of retardation as the speed of the train decreases, as is characteristic of the well known friction brake. Also the self regulating properties of the electrodynamic brake reduce the hazard of the wheels slipping, even when the brake is heavily applied, as in emergency situations. Furthermore, this high braking effort is obtained with an electrodynamic brake without the friction and wear incident to the use of a friction brake.

When an electrodynamic brake is employed the braking effect becomes less and less as the vehicle speed decreases, until, near zero speed, the electrodynamic brake has substantially no retarding effect. It is, therefore, necessary to supplement the electrodynamic braking equipment with another brake, such as the well known friction brake, so that, at low vehicle speed, the friction brake will act to provide the desired braking effect until the vehicle has been brought to a complete stop. The auxiliary or friction brake is also desirable where an eddy current dynamic brake is used because the braking torque of the eddy current brake depends upon continuity of electric power being supplied thereto to maintain application of the brake coils.

It is a general object of my invention to provide a dual braking system of the type described, and control means in conjunction therewith, for effecting an application of the electrodynamic brake at relatively high vehicle speeds and which will automatically release the electrodynamic brake and apply the friction brake at relatively low vehicle speeds in a manner to bring the vehicle to a complete stop without appreciable shock.

Another object of my invention is to provide means for applying the friction brake at speeds higher than those at which it is normally applied for making emergency stops, and for effecting concurrent application of both the electrodynamic brake and the friction brake under emergency stop conditions.

A further object of my invention is to provide an interlock system between the electric brake equipment and the friction brake equipment which acts in accordance with the effectiveness of the electrodynamic brake to prevent application of the friction brake so long as the electrodynamic brake is appreciably effective, and to automatically release the electrodynamic brake when it becomes less effective and to simultaneously cause application of the friction brake to be applied with sufficient braking force to bring the vehicle to a complete and full stop.

Other objects and advantages of my invention will be apparent from the following description taken in connection with the accompanying drawings, in which.

Figure 1:
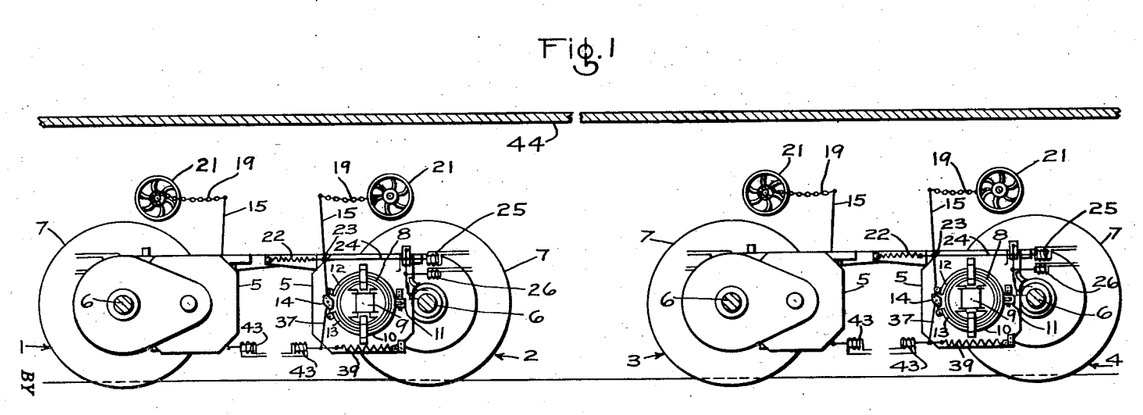
Fig. 1 is a schematic view of a two truck, four axle street car, to which one embodiment of my invention is applied.
Figure 2:
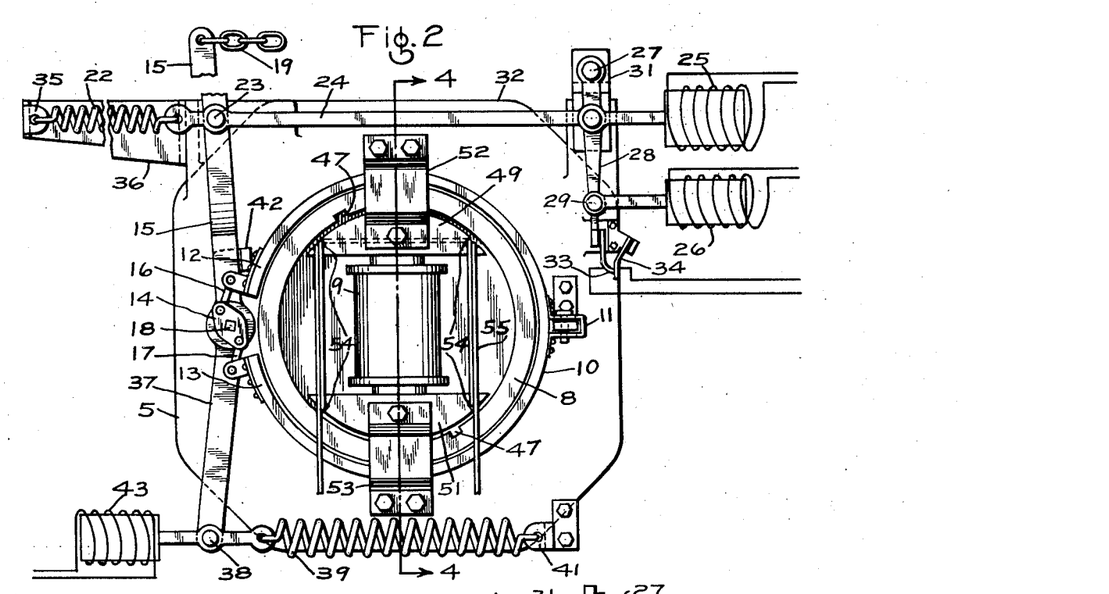
Fig. 2 is a diagrammatic elevational view of one of the brake mechanisms.

Referring to the drawings and particularly to Figs. 1 and 2 thereof, the illustrated embodiment of my invention is applied to each of the four axles of a two truck, four axle street car, the several units being indicated at 1, 2, 3 and 4. A driving motor 5 is geared to each axle 6 for driving its associated wheels 7. To each motor shaft is connected a brake drum 8 of magnetic material, through which braking effort may be applied by either or both of two brakes, an eddy current brake, having an operating winding 9, and a friction brake having a brake band 10. The brake band 10 is mounted at its midpoint 11 to surround the brake drum 8, the opposite ends 12 and 13 of which are connected by links 16 and 17 to an operating cam 14 keyed to a brake lever 15 through a shaft 18. The brake lever 15 and the parts for operating it constitute the service portion of the friction brake. To the upper end of the lever 15 a chain 19 is connected and is wound on the ratcheted hand wheel 21 for operating the lever in a clockwise direction, as viewed in Fig. 2, against the pressure of a service spring 22 that is biased to move the lever 15 in a counterclockwise direction and apply the brakes. The chain and ratcheted hand wheel are required to overcome the spring pressure and hold the brake released only when it is desired to cut the brake out of service, or when electric power is not available. As shown in Fig. 1 a separate hand wheel 21 is provided for each brake unit and is located below the floor 44 of the car and outside of the car so that it cannot be operated by the operator or by an unauthorized person within the car. Obviously a single hand wheel might be used to release all the brake units, if desired.

As best shown in Fig. 2, a rod 24 is pivotally connected to the lever 15 at the point 23 and is connected to be actuated by a release solenoid 25 for operating the brake to its release position against the force of a service spring 22, and also against the force of an emergency spring 39, to be more fully described later. When so operated to its release position, the brake is held in that postion by a service holding solenoid 26 that is connected to the rod 24 through a lever 28, pivotally mounted at 27 upon a bracket 31 extending upwardly from the frame 32 of the motor 5, and pivotally connected at 29 to the service solenoid. The lever 28 carries a movable contact member 33 which engages a fixed contact member 34, when the brake is in its release position, closing a circuit through the limit switch comprising these members for a purpose to be later described.

In addition to the service portion of the friction brake above described, an emergency portion is provided comprising a lever 37 loosely mounted upon the shaft 18 to move independently thereof and extending downwardly therefrom to the pivot 38. An emergency spring 39 is connected between the pivot 38 and a bracket 41 mounted upon the motor frame for biasing the lever 37 in a counterclockwise direction to apply the friction brake. The lever 37 has an upwardly projecting portion terminating in a lug 42 for engaging the side of the upper lever 15 to move it also in a counterclockwise direction upon movement of the lever 37 by the spring 39. An emergency holding solenoid 43 is provided for opposing the bias of the spring 39 to hold it in its release position when actuated to that position by the release solenoid 25, which operates against the pull of both the service spring 22 and the emergency spring 39.

Figure 4:
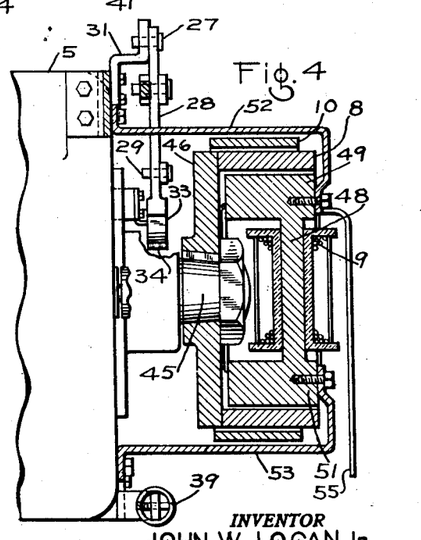
Fig. 4 is a sectional view taken on the line 4—4 of Fig. 2.

The electrodynamic brake employed may be of any suitable construction, such as that described in my copending application Case 3674, for Vehicle braking system, Serial No. 696,993, filed November 7, 1933, and assigned to the same assignee as this application. The brake drum 8, which is made of magnetic material, is suitably fastened to the motor shaft 45 by a hub portion 46. Axially extending slots 47 are provided in the magnetic material of the brake drum 8 for a purpose to be later described. The eddy current exciting or field winding coil 9 is mounted within the brake drum 8 about a core member comprising the winding section 48 extending through the coil 9, and pole pieces 49 and 51 that are shaped to conform to the brake drum 8. Supporting brackets 52 and 53 are provided to support the core and coil structure of the eddy current brake within the brake drum from the frame of the motor.

As best shown in Fig. 2 slots 54 are provided axially of the outer edges of the pole pieces 49 and 51 in which are positioned the conductors of a checking winding 55 in which a voltage is induced that is a measure of a condition of the electrodynamic brake. The electrodynamic or eddy current brake described is applied by energizing the exciting winding thereof, whereupon a magnetic flux is established having a path from one pole piece 49, across the air gap to the magnetic material of the brake drum 8, around the two halves of the brake drum, across the air gap to the pole piece 51 to the winding portion 48 of the magnetic core. Since the brake drum hub 46 and the supporting brackets 52 and 53 are of non-magnetic material, substantially all of the flux produced by the energizing winding 9 is confined to the magnetic path described. If the brake drum is rotating, eddy currents will be generated in the magnetic portion, these eddy currents reacting with the flux producing them to provide a retarding motion of the drum 8 of the brake.

When the brake drum is rotating there is a variation in the magnetic flux across the air gaps between the pole pieces 49 and 51 and the magnetic brake drum 8 whenever the slots 47 pass across the pole pieces. This variation, which is periodic, causes a temporary variation in the flux cutting the checking winding 55, thus generating in this winding a voltage that is proportional to the frequency of the passage of the slots across the pole pieces, which is proportional to the speed of the vehicle. Since the eddy currents generated in the brake drum and effective for braking the vehicle are proportional to the speed of the vehicle, the voltage induced in the checking winding 55 may be used to control the application of the friction brake upon a predetermined decrease in the effectiveness of the eddy current brake as will be more fully hereinafter described.

In order to better understand the braking mechanism as a unit the following description of its operation is given before describing the control circuits and the operation of the system as a whole. The brake lever 15 is biased in a counterclockwise direction by the service spring 22, or in a direction to apply the brakes. The chain 19 may be wound on the ratchet wheel 21 thus overcoming the spring pressure and holding the brakes released when it is desired to cut out the brakes from service or to release it when electric power for so doing is unavailable. The brake is normally released by movement of the crank lever 15 in a clockwise direction against the spring 22 by action of the relatively high capacity release solenoid 25 that is energized from the trolley circuit. Once released, the small service solenoid 26, energized from a low voltage control circuit, will suffice to retain the brake lever in its released position against the force of the service spring 22. The service solenoid 26, therefore, acts as a latching device and may, in practice, actually hold a mechanical latch in position, but for the sake of simplicity in describing the invention is shown as a plunger type electromagnet acting through a relatively greater leverage than does the release solenoid 25. Because the magnetic pull varies as the square of the distance of movement of the magnetic core, the service solenoid 26 has a negligible effect in pulling the rod 24 toward the right to release the brakes until the core of the solenoid has been actuated by the release solenoid to its illustrated position. When the brake is actuated to its release position by the release solenoid 25 a circuit is closed through the contact members 33 and 34 of the limit switch, which, when all of the several brake mechanisms of the car have been similarly actuated, closes a circuit to be later described for causing the operation of a relay to deenergize the relatively heavy release solenoid 25.

Figure 3:
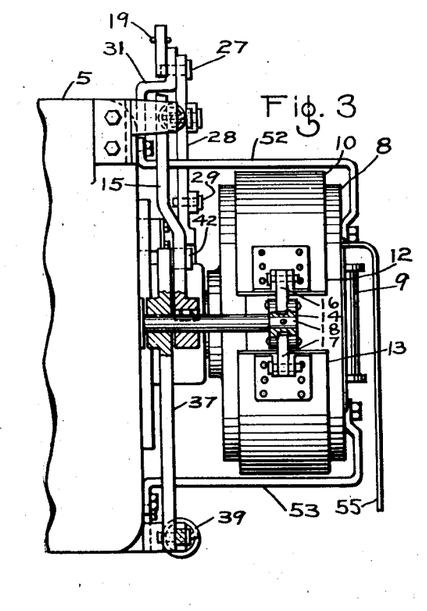
Fig. 3 is an end view of the brake mechanism shown in Fig. 2.

As will appear by reference to Figs 2 and 3, deenergization of the emergency holding solenoid 43 will cause the emergency spring 39 to apply its force, through the lever 37 and the lug 42, to force the brake lever 15 in a counterclockwise direction. The force of the emergency spring 39 is thus added to the force of the service spring 22, acting through the rod 24 and lever 28, and the combined force of these two springs is sufficient to force the plunger of the holding magnet from its solenoid 26, thus applying the friction brake in an emergency application.

Energization of the release solenoid 25, after application of the brake in its emergency position, will operate against the combined force of the service spring 22 and the emergency spring 39 actuating them both to their brake release positions where they will be held by their respective holding coils 43 and 26. Once reset, the emergency spring 39 will be restrained from action so long as the emergency solenoid 43 remains energized. The service spring 22 can act independently of the emergency spring 39, but, if the emergency solenoid 43 be deenergized, both springs 39 and 22 will act since the service solenoid is incapable of restraining the combined forces of these two springs.

So long as power is supplied to the car through the trolley circuit so that the eddy current brakes, once applied, may remain effective these brakes alone are sufficient to produce the maximum permissible braking torque at all but the lowest car speeds. When the braking force decreases at a low speed, say about four miles per hour car speed, a relatively light spring pressure is sufficient as a supplementary brake, which brake is automatically applied. This will give a retardation rate at very low speeds somewhat less than adhesion permits, but, because the retardation is at a high rate at the higher speeds this combined braking power will give a stopping distance closely approximating the ideal minimum and, at the same time, will insure an easier transition at the stop than is ordinarily experienced with high retardation rates of braking.

If, however, power fails so that the eddy current brakes become ineffective, then the relatively light spring pressure caused by the service spring of the friction brake will be inadequate at high speeds. If the emergency spring be employed at these speeds it can give an overall stopping distance nearly as short as is normally obtained when the eddy current brake is operated, but will give a rough final stop and will probably cause sliding of the wheels for a short distance just as the car approaches its stop. This spring is, therefore, employed only as an emergency measure.

Figures 5, 6:
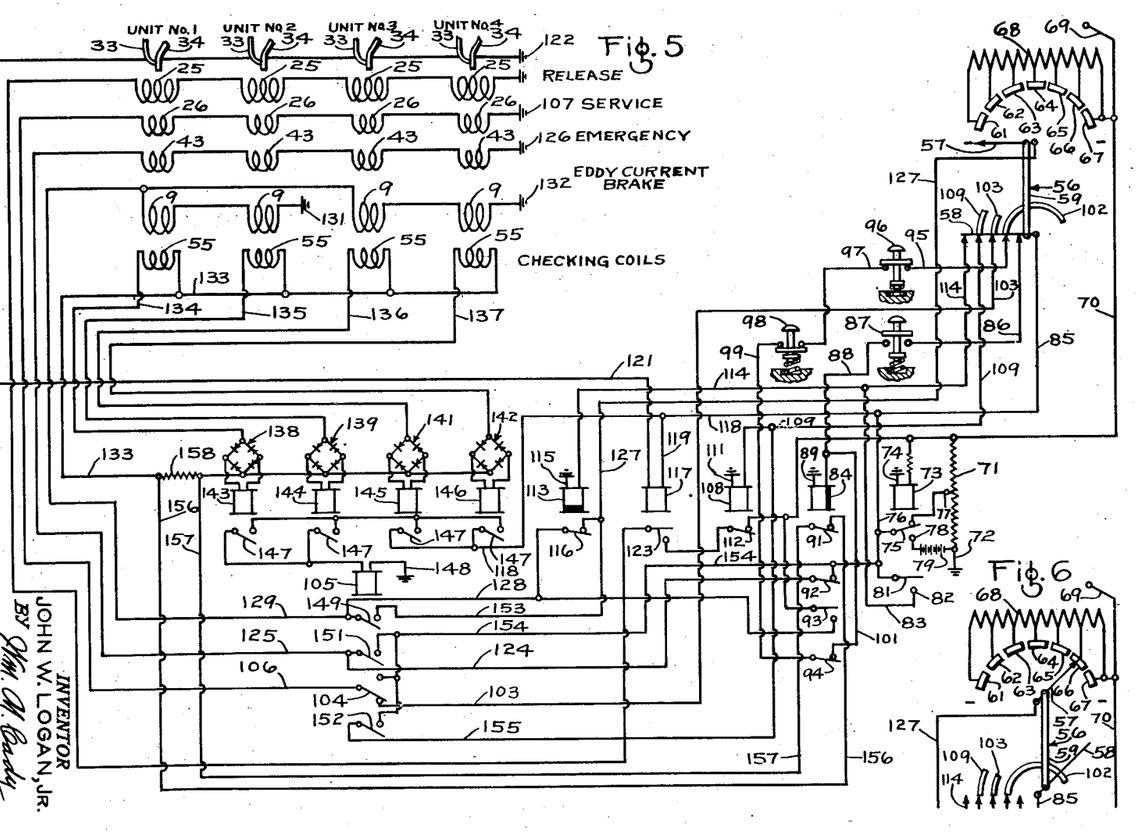
Fig. 5 is a diagrammatic view of the circuits and apparatus comprising one complete embodiment of the invention.
Fig. 6 is a diagrammatic view of the control mechanism shown in its brake applying position.

Referring to Fig. 5, the limit switch and several control coils for each of the four units illustrated in Fig. 1 are shown in the upper left hand corner. The several coils and limit switches associated with the four braking units in Fig. 5 are numbered to correspond to the same elements in Figs. 1, 2, 3 and 4. Under each unit number is shown the limit switch for that unit having contacts 33 and 34, and, directly below, the several coils 25, 26, 43, 9 and 55, referring, respectively, to the release coil, service coil, emergency coil, eddy current field winding, and eddy current checking winding for that unit.

The controller 56, for controlling the application of the brakes, is shown in Fig. 5 in its brake release position. This controller comprises movable contact members 57 and 58 connected by an operating handle 59 for jointly actuating them.

The contact member 57 is adapted to engage successive contact members 61 to 67 for cutting out various blocks of resistance from the control resistor 68 of a brake controlling rheostat that is connected to the trolley 69. A supply circuit, from which the electrically operated devices of the brake system are energized extends from the trolley 69 through conductor 70, resistor 71 to ground at 72.

A low voltage release relay 73 is provided connected between the conductor 70 and ground at 74, which, so long as there is voltage on the trolley circuit, maintains its armature or contact member 75 in the upper or illustrated position connecting a conductor 76 to the resistor 71 at the point 77 for energizing several relays to be later described. Upon failure of voltage in the trolley circuit the contact member 75 drops to engage the contact member 78 thus connecting a battery 79 to the conductor 76 to maintain the several relays energized. At the same time a circuit is closed from the battery 79 through lower contact members 81 and 82 of the relay 73 thus connecting a conductor 83 to the battery 79 for a purpose to be later described.

An emergency relay 84 having a "quick drop, slow pickup" characteristic is provided, the initial energization of which is provided by closing a circuit extending from the point 77 on the resistor 71, or from the battery 79, through the contact member 75 of the low voltage relay 73, by conductor 76, conductor 85, contact member 58 of the brake controller 56 in its illustrated position, conductor 86, emergency reset push-button switch 87, conductor 88, the winding of the relay 84, and to ground at 89. When the emergency relay 84 is energized, its armature is actuated upwardly, thus moving the several contact members 91, 92, 93 and 94 of the relay to their upper, or illustrated positions. When the relay 84 has been energized, and actuated to its illustrated position, by operation of the emergency reset push-button switch 87 it is held in its energized position by a holding circuit extending from the conductor 76, through conductor 85, the contact member 58 of the controller 56 in its illustrated position, contact member 102, conductor 95, a dead man's push-button switch 96, conductor 97, conductor's switch 98, conductor 99, the lower relay contact member 94, and conductor 101 to the winding of the relay 84, and to ground at 89. This holding circuit may be interrupted either by operation of the conductor's push-button switch 98, release of the dead man switch 96 on the controller of the motor control mechanism, or by operation of the controller 56 in a clockwise direction sufficiently that the contact member 58 travels beyond a position of engagement with the segment 102 that is connected to the conductor 95. A circuit from the controller 56 for energizing the service holding solenoids 26 of the several brake mechanisms is completed from the movable controller contact member 58, through contact member and conductor 103, contact member 104 of a transfer relay 105 in its deenergized, or illustrated position, conductor 106, through the several service coils 26 of the several brake mechanism units, and to ground at 107.

A release relay 108 is provided, and is energized from a circuit completed from the movable contact member 58 of the controller 56, through conductor 109, coil of the relay 108, and to ground at 111, actuating the relay contact member 112 to its upper, or illustrated position.

A slow release relay 113 is provided for a purpose to be later described, and is energized from a circuit extending from the movable contact member 58 of the controller 56, through conductor 114, the winding of the relay 113, to ground at 115. This relay, when energized, maintains its movable contact member 116 in the upper, or illustrated position.

A release cut-out relay 117 is provided and is energized by a circuit extending from the conductor 76 through conductor 118, conductor 119, the winding of the relay 117, conductor 121, and the several limit switches represented by the cooperating pairs of contact members 33 and 34, associated with the several brake units, to ground at 122. The relay 113, when energized, maintains its contact member 116 in its upper or illustrated position.

With the controller 56 in its illustrated or brake releasing position, the several relays 113, 108 and 84 are maintained in their energized or illustrated position by the completion of their several circuits through the movable contact member 58 of the controller. The several braking units are in their illustrated positions maintaining the limit switch contact members 33 and 34 thereof in their circuit closing position, thus energizing the relay 117 which is held in its circuit-interrupting position, preventing energization of the release solenoids 25 of the several braking units. The several holding solenoids 26, associated with the several brake mechanisms, are maintained energized through the above traced circuit, and the emergency holding solenoids 43 are maintained energized through a circuit extending from the conductor 76, through contact member 92 of the relay 84 in its illustrated or energized position, through conductors 124 and 125, and windings 43 to ground at 126. The field windings 9 of the eddy current brake are in their deenergized condition as are also the checking coils 55 of the brake mechanism which are inductively related thereto.

If the motorman desires to apply the brake, he moves the controller 56 in a clockwise direction, causing engagement of the movable contact member 57 with one of the contact members 61 to 67 inclusive, connected to respective portions of the rheostat resistor 68, thus energizing the eddy current field windings 9 through a circuit extending from the trolley 69, resistor 68, controller contact member 57, through conductor 127, contact member 116 of the slow release relay 113, conductors 128 and 129, through the windings 9 of the eddy current brake to ground at 131 and 132.

Immediately upon energization of the eddy current field windings 9 the checking coils 55 are inductively energized therefrom, thus applying voltage to the several circuits having a common conductor 133 and individual conductors 134, 135, 136 and 137, respectively connecting the several rectifying devices 138, 139, 141 and 142, to be energized by alternating current from the checking coil windings 55. The rectifying devices 138, 139, 141 and 142, may be of any suitable type, but are here illustrated as of the dry type oxide disc rectifiers arranged for full wave rectification. The several rectifying devices, when energized by alternating current from the above described circuit, cause direct current to flow to their respective relays 143, 144, 145 and 146, each of which will actuate its associated contact member 147 to a circuit closing position and complete a circuit from the conductor 76 through conductor 118, contact member 147 of the several rectifier operated relays to the windings of the relay 105 and to ground at 148, thus energizing the relay 105 and actuating the contact members 149, 151 and 152, to their circuit closing positions, and the contact member 104 to its upper circuit closing position. A circuit is now closed from the controller contact member 57, through conductor 127, conductor 153, contact member 149 of the relay 105 in its upper position, conductor 129 and through the field windings 9 of the eddy current brakes, this circuit being completed in shunt relation to that portion of the circuit including the contact member 116 of the slow release relay 113 through which the circuit was initially completed. The relay 113 now drops to its open circuit position, but since this is a slow acting release relay, it will not interrupt the circuit through its contact member 116 until after the relay 105 has operated to complete the circuit through its contact member 149.

Upon movement of the controller 56 to a braking position, the circuit above traced for energizing the release relay 108 was interrupted by separation of the movable contact member 58 from engagement with the conductor 109. A circuit was, however, completed upon operation of the transfer relay 105 to its upper position extending from the conductor 76 through conductor 154, contact 152 of the relay 105 in its circuit closing position, conductor 155 to conductor 109, through the winding of the relay 108 to ground at 111. During operation of the controller 56 to a position effecting engagement of the contact member 57 with any of the several contact members 61 to 67 inclusive, the holding circuit of the relay 84 is maintained energized, since the conductor 95 terminates in a segment 102 which remains in engagement with the movable contact 58 unless the controller 56 is moved to its emergency position, which is approximately 180° from the position illustrated in Fig. 5.

Upon movement of the controller 56 to a braking position, the circuit to the service holding solenoids 26, above traced, is interrupted at the junction between the conductor 103 and the movable contact member 58 of the controller. The controller is so arranged that just prior to the interruption of this circuit the movable contact member 57 engages the contact member 61 of the rheostat 68, thus energizing the field windings 9 of the eddy current brake and immediately energizing the transfer relay 105 causing the contact member 104 thereof to be actuated to its upper, or circuit closing position. In this position the service holding solenoids 26 are maintained energized by a circuit through the contact member 104 which connects the conductors 106 and 154.

Since the emergency relay 84 is maintained in its energized or illustrated position for any position of the controller 56 other than its emergency position, the circuit to the emergency holding coil 43 will be maintained completed through the contact member 92 of the emergency relay. So long as the transfer relay 105 is in its energized or upper position, this circuit will also be maintained from conductor 76 through conductor 154 and contact member 151 in its circuit closing position. It is now required that both the emergency relay 84 and the transfer relay 105 become energized before the circuit to the emergency holding coils 43 will be interrupted.

During a normal braking operation the motorman will advance the controller 56 so that the contact member 57 engages one of the contact members 61 to 67 depending upon the amount of braking required. When the vehicle has slowed down sufficiently so that a very low voltage is induced in the checking coils 55, the energization of the relays 143, 144, 145 and 146 drops below that value required to maintain them in their circuit closing positions, and the transfer relay 105 becomes deenergized and drops to its lower or illustrated position.

Upon operation of the transfer relay 105 to its deenergized position the contact member 149 interrupts the circuit between the conductors 129 and 153, thus deenergizing the eddy current brake field windings 9, since the slow release relay 113 is now in its deenergized or circuit opening position. The contact member 104 also interrupts the circuit between the conductor 106 and conductor 154, thus deenergizing the service holding solenoids 26 and permitting application of the brakes by means of the service springs 22.

Application of the friction brakes by the service springs 22 causes the several limit switches comprising contacts 33 and 34 to interrupt the circuit to the release cut-out relay 117, thus permitting its contact member 123 to drop to its lower, or circuit closing position. This operation of the relay 117, however, is not permitted to energize the release solenoid 25 because upon deenergization of the transfer relay 105, the circuit through the contact member 152 thereof, extending through the winding of the release relay 108, was interrupted, permitting the contact 112 to drop to its lower or circuit interrupting position. It will be noted, as stated above, that so long as the emergency relay 84 remains energized the movement of the contact member 151 of the transfer relay 105 has no effect on the emergency holding solenoids 43.

Should there be a failure of power to the trolley 69 while the controller 56 is in its release or illustrated position, the low voltage relay 73 will be deenergized and operate its contact member 75 to connect the conductor 76 to one terminal 78 of the battery 79, thus maintaining energized all relays formerly energized from the point 77 on resistor 71. Thus, no change in any part of the brake system will occur. If there is a failure of power to the trolley 69 after the brakes have been applied, there will be an immediate deenergization of the windings 9 of the eddy current brake and a consequent operation of the transfer relay 105 to its deenergized or lower position, as in the case of a final stop. The service holding solenoids 26 will accordingly be deenergized permitting application of the friction brakes by operation of the service springs 22. Should the failure of power occur at a relatively high speed while the eddy current brake is applied, the motorman may wish further braking than can be obtained by operation of the service spring 22 alone and move the controller handle to the emergency position, thus interrupting the circuit through the contact members 58 and 102 to deenergize the emergency relay 84 which has a quick drop-slow pickup characteristic. Since the contact member 151 of the transfer relay 105 is in its lower position, the emergency holding coils 43 will be deenergized immediately upon movement of the contact member 92 of the emergency relay to its lower, or circuit opening, position.

It will be noted that the output voltages from the checking coils 55 are substantially proportional to the eddy current in the brake rotor, so that if the eddy current brake is only partially excited by failure of the motorman to operate the controller 56 to a position effecting higher current in the rotor of the brake, the transfer relay 105 will operate at a higher speed than would occur if full eddy current brake excitation were used. Since, in the present arrangement, the transfer is being made to a fixed pressure friction brake, this inherent characteristic is an advantage attempting to obtain smooth transition. It will be apparent, for example, that if the transfer relay 105 operated always at a fixed speed, then the torque of the eddy current brake at this speed might, because of the rheostatic control, be relatively light, whereas the friction brake would still apply with a fixed torque which equals that for the fully energized eddy current brake. Since the operation of the transfer relay is dependent upon the eddy current in the rotor of the brake instead of operating at a fixed speed, a much smoother transition results. Should it be desired to make an emergency stop with the braking system, this may be done by operating the controller 56 to its emergency position, interrupting the holding circuit for the emergency relay 84 by separation of the movable contact members 58 and 102. This circuit may also be interrupted by operation of the dead man switch 96 to its circuit interrupting position, or operation of the conductor's push-button switch 98 to its circuit interrupting position. Deenergization of the emergency relay 84 causes the several contact members 91, 92, 93 and 94 thereof to be actuated to their lower positions. The contact member 94 interrupts a point in the holding circuit for the relay 84 which will remain interrupted until the relay is again operated to its circuit closing position by closing the circuit through the emergency relay push-button switch 87, which can be done only while the controller 56 is in its release or illustrated position. The relay 84 is so arranged as to have a timed delay pickup that is sufficiently long to prevent its being actuated to its circuit closing position until the train has had time to come to a complete stop.

The operation of the contact member 93 of the relay 84 effects closing of a circuit from the conductor 70, through conductors 128 and 129 and the windings 9 of the eddy current brake, thus fully energizing these windings. It will be noted that this circuit is independent of the position of the transfer relay 105 so that the eddy current brakes are maintained energized until the vehicle has come to a complete stop. The operation of the contact member 92 to its lower position interrupts one of the two parallel circuits above traced for energizing the emergency holding coils 43. These coils will, however, be energized through the contact member 151 of the transfer relay 105 in the same manner as above described for normal operation of the brake system, the relay 105 being energized immediately upon energization of the windings 9 of the eddy current brakes. The operation of the contact member 91 to its circuit interrupting position interrupts a shunt circuit through the conductors 156 and 157 around the resistor 158 and introduces this resistor into the circuit comprising conductor 133 between the checking coils 55 of the eddy current brake and the several rectifying devices 138 and 139, 141 and 142. This causes a lower voltage to be applied to the windings of the relays 143, 144, 145 and 146 for a given energization of the field windings 9 of the eddy current brake, thus causing the several relays to open at a higher brake value than for normal service operation. The transfer relay 105 will therefore be deenergized and drop to its illustrated position at a higher current output from the eddy current brake during emergency operation than it will during service operation as previously described. Deenergization of the transfer relay 105 under the conditions above described causes the emergency holding solenoids 43 to be deenergized by interruption of the circuit through the contact member 151, thus effecting complete emergency application of the friction brakes.

It will be noted that the eddy current field windings 9 for units Nos. 1 and 2 are connected in series circuit relation, but are in parallel circuit relation with the windings 9 for units Nos. 3 and 4. The first and second units correspond to those on one truck of the car while the third and fourth units correspond to those on the second truck of the car. It has been pointed out that separate relays 143, 144, 145 and 146 are connected to the several separate checking coils 55 of the eddy current brakes associated with the separate brake units. It will also be noted that the circuit from the conductor 118 to the winding of the transfer relay 105 is completed through the contact members 147 of the relays 145 and 146 in parallel circuit relation and in series circuit relation with the parallel connected contact members 147 of the relays 143 and 144. With this connection the transfer relay 105 will not drop to its change-over position unless the speed of both wheel axles on one truck is low. This prevents the slipping of a single axle on both trucks from causing friction brake application, which could not be immediately released, and thus allows the inherent fading of the eddy current reaction at low speeds to automatically release the torque and permit the wheels to roll again. At the same time, this circuit insures a transfer to friction braking on all four axles if the braking force on both the eddy current brakes on either truck decreases sufficiently that the series circuit on either truck becomes open circuited. That is, interruption of the circuit through both relays 143 and 144 will deenergize the relay 105, independently of the condition of the relays 145 and 146, and deenergization of both the relays 145 and 146 will likewise deenergize the transfer relay 105 independently of the condition of the relays 143 and 144.

While one illustrated embodiment of my invention has been described, many modifications thereof will occur to those skilled in the art within the spirit of my invention and I do not wish to be limited otherwise than by the scope of the appended claims.

Having now described my invention, what I claim as new and desire to secure by Letters Patent, is:

1. In a vehicle braking system, in combination, a friction brake, means for operating the brake including a service portion and an emergency portion, said service portion comprising a service spring for applying the brake, electroresponsive means for actuating the brake to its released position, and electroresponsive means for normally retaining the service spring in its brake releasing position, said emergency portion comprising an emergency spring for applying the brake, and electroresponsive means for normally preventing the emergency spring from applying the brake.

2. In a vehicle braking system, in combination, a friction brake, means for operating the brake including a service portion and an emergency portion, said service portion comprising a service spring for applying the brake, electroresponsive means for actuating the brake to its released position and electroresponsive means for normally retaining the service spring in its brake releasing position, said emergency portion comprising an emergency spring for applying the brake, electroresponsive means for normally preventing the emergency spring from applying the brake, and means whereby, upon operation of said emergency portion to apply the brake, the service portion is caused to operate to its brake applying position.

3. In a vehicle braking system, in combination, a friction brake, means for operating the brake including a service portion and an emergency portion, said service portion comprising a service spring for applying the brake, electroresponsive means for actuating the brake to its released position and electroresponsive means for normally retaining the service spring in its brake releasing position, said emergency portion comprising an emergency spring for applying the brake, and electroresponsive means for normally preventing the emergency spring from applying the brakes, said last named electroresponsive means being effective, when deenergized, to permit operation of the brake by the emergency spring, and means whereby, upon application of the brakes by the emergency spring, the service spring also acts to apply further pressure to the brake.

4. In a vehicle braking system, in combination, a friction brake, service actuating means for operating the brake to its braking position, emergency actuating means for operating the brake to its braking position, releasing means for operating both of said actuating means to their brake releasing position, and means associated with each of said actuating means for holding it in its release position.

5. In a vehicle braking system, in combination, a friction brake, service actuating means for operating the brake to its braking position, emergency actuating means for operating the brake to its braking position, releasing means for operating both of said actuating means to their brake releasing position, and separate means associated with each of said actuating means for holding it in its release position, the holding means associated with said service actuated means being effective, when released, to apply the brakes by operation of the service actuating means only, and the holding means associated with said emergency actuating means being effective, when released, to apply the brakes by operation of both the service actuating means and the emergency actuated means.

6. In a vehicle braking system, in combination, a friction brake, service actuating means for operating the brake to its braking position, emergency actuating means for operating the brake to its braking position, releasing means for operating both of said actuating means to their brake releasing positions, and separate means associated with each of said actuating means for holding it in its released position, the holding means associated with the emergency actuating means being effective to retain that means in its brake releasing position independently of the operation of said service actuating means, and the holding means associated with said service actuated means being ineffective to retain that means in its brake releasing position upon application of the brake by the emergency actuating means.

7. In a vehicle braking system, in combination, a service spring biased for operating the brake to its braking position, an emergency spring biased for operating the brake to its braking position, means for opposing the bias of said service spring to hold it in its brake releasing position, means for opposing the bias of said emergency spring to hold it in its brake releasing position, and means effective, upon release of the emergency spring holding means, for applying the force of said emergency spring together with that of said service spring in opposition to the force of the service spring holding means, said combined spring forces being sufficient to release the holding means and apply the brake.

8. In a vehicle braking system, in combination, a service spring biased for operating the brake to its braking position, an emergency spring biased for operating the brake to its braking position, means for opposing the bias of said service spring to hold it in its brake releasing position, means for opposing the bias of said emergency spring to hold it in its brake releasing position, means effective upon release of the emergency spring holding means for applying the force of said emergency spring together with that of said service spring in opposition to the force of the service spring holding means, said combined spring forces being sufficient to release the holding means and apply the brakes, and brake releasing means for simultaneously biasing both springs to their brake releasing position.

9. In a vehicle braking system, in combination, an electrodynamic brake, and manually operable means for varying the braking force, an electrically controlled friction brake, and means responsive to a predetermined minimum in the braking force of said electrodynamic brake, while the manually operable means is in a brake applying position, for applying said friction brake.

10. In a vehicle braking system, in combination, an electrodynamic brake, manually operable means for varying the braking force, an electrically controlled friction brake, a plurality of means for applying pressure to said friction brake, means responsive to a condition of the electrodynamic brake for automatically bringing one of said pressure applying means into operation, and means jointly responsive to a condition of the electrodynamic brake and to a selected position of the manually operated means for automatically bringing both of said pressure applying means into operation.

11. In a vehicle braking system, in combination, an electrodynamic brake, manually operable means for varying the braking force, an electrically controlled friction brake, a plurality of means for applying pressure to said friction brake, means responsive to a predetermined minimum in the braking force of said electrodynamic brake while the manually operable means is in a brake applying position for employing one of said pressure applying means, and means responsive to a predetermined minimum in the braking force of said electrodynamic brake while the manually operable means is in a selected position for automatically bringing both of said pressure applying means into operation.

12. In a vehicle braking system, in combination, an electrodynamic brake, manually operable means for varying the braking force, an electrically controlled friction brake, and means responsive to a failure of power supplying the electrodynamic brake while the manually operable means is in a brake applying position for applying said friction brake.

13. In a vehicle braking system, the combination of a friction brake, an electrodynamic brake, means for controlling the operation of said brakes for service application whereby the electrodynamic brake, upon a predetermined minimum in its braking force, automatically controls the interruption of its own braking action and applies the friction brake, and means for controlling the operation of said brakes for emergency application whereby the electrodynamic brake causes the application of the friction brake to exert a higher braking force at a higher predetermined minimum in its own braking force.

14. In a vehicle braking system, the combination of a friction brake, an electrodynamic brake, manual means for controlling the application of said electrodynamic brake, means automatically controlled upon a decrease in the braking force of said electrodynamic brake to a predetermined minimum during service application thereof, for causing application of said friction brake at a moderate braking pressure, and means automatically controlled upon a decrease in the braking force of said electrodynamic brake to a higher predetermined minimum during emergency application thereof, for causing application of said friction brake at a higher braking pressure.

15. In a vehicle braking system, in combination, an electrically controlled friction brake, an electrodynamic brake, manually conditioned controlling means, means for applying said electrodynamic brake in accordance with a condition of said controlling means, and means for applying said friction brake in accordance with a condition of said electrodynamic brake.

16. In a vehicle braking system, in combination, a friction brake and electroresponsive control means therefor, an electrodynamic brake, manually operated means for varying the braking force of the electrodynamic brake, and means jointly responsive to a condition of said manually operated means and to a condition of said electrodynamic brake for applying said friction brake.

17. In a brake system for vehicles, in combination, an electrodynamic brake, a friction brake, means for varying the degree of application of one of said brakes, and means whereby one of said brakes automatically becomes effective upon the other of said brakes becoming ineffective.

18. In a vehicle braking system, the combination of a friction brake, an eddy current brake, a manually controlled rheostat for controlling the braking force of said eddy current brake, and means controlled by a condition of the eddy current brake for rendering the friction brake ineffective.

19. In a vehicle braking system, the combination of a friction brake, an eddy current brake, means for controlling the braking force of the eddy current brake, means responsive to a predetermined condition of said eddy current brake for causing a service application of said friction brake, and means responsive to a different predetermined condition of said eddy current brake for causing an emergency application of said friction brake.

20. In a vehicle braking system, in combination, a friction brake, an electrodynamic brake, said friction brake comprising a service portion and an emergency portion, electroresponsive means normally energized for holding said service portion in its released position and electroresponsive means normally energized for holding said emergency portion in its released position, means for controlling said brakes comprising a transfer relay and an emergency relay, said transfer relay being effective to cause application of the service portion of said friction brake upon a predetermined condition of said dynamic brake when said emergency relay is in one operative position, and to cause application of the emergency portion of said friction brake upon a different predetermined condition of said dynamic brake when said emergency relay is in another operative position.

21. In a vehicle braking system, in combination, an electromechanically operated friction brake, an electrodynamic brake, manually conditioned controlling means therefor, and means governed by one condition of said controlling means for preventing concurrent operation of said brakes and governed by another condition of said controlling means for causing concurrent operation of said brakes upon a decrease in the braking force to a predetermined value.

22. In a vehicle braking system, in combination, an electromagnetic friction brake, an electrodynamic brake, manually conditioned controlling means therefor, and means governed by one condition of said controlling means for causing operation of said electrodynamic brake when electric power is maintained on the control system and for causing immediate operation of said friction brake when the supply of power to the control system is interrupted.

23. In a vehicle braking system, in combination, a friction brake, an electrodynamic brake, manually conditioned controlling means therefor, and means governed by one condition of said controlling means for causing initial operation of said electrodynamic brake and subsequent transfer to said friction brake upon one condition of the control system and for causing immediate operation of said friction brake upon another condition of the control system.

24. In a vehicle braking system, in combination, a friction brake, an electrodynamic brake, manually conditioned controlling means therefor, and means governed by one condition of said controlling means for causing initial operation of said electrodynamic brake and subsequent concurrent operation of said two brakes upon one condition of the control system and for causing immediate full application of said friction brake upon another condition of the control system.

25. In a vehicle braking equipment, in combination, a plurality of vehicle trucks each having a plurality of wheel axles, an electrodynamic brake associated with each wheel axle, a friction brake associated with each wheel axle, manually operable means for simultaneously controlling the application of said several electrodynamic brakes, and means responsive to a condition of said electrodynamic brakes for applying said friction brakes.

26. In a vehicle braking equipment, in combination, a plurality of vehicle trucks each having a plurality of wheel axles, an electrodynamic brake associated with each wheel axle, a friction brake associated with each wheel axle, manually operable means for simultaneously controlling the application of said several electrodynamic brakes, and means responsive to a predetermined decrease in the speed of all wheel axles on any one truck for applying said friction brakes.

27. In a vehicle braking equipment, in combination, a plurality of vehicle trucks each having a plurality of wheel axles, an electrodynamic brake associated with each wheel axle, a friction brake associated with each wheel axle, manually operable means for simultaneously controlling the application of said several electrodynamic brakes, and means jointly responsive to a decrease in the speed of all wheel axles on any one truck and in a decrease in the energization of the electrodynamic brakes associated therewith for applying said friction brake.

JOHN W. LOGAN, JR.